US012508630B2

(12) United States Patent
Ghosh et al.

(10) Patent No.: US 12,508,630 B2
(45) Date of Patent: Dec. 30, 2025

(54) SYSTEM AND PROCESS FOR REMOVING DEBRIS FROM PLASTIC SHEETS

(71) Applicant: Signode India Ltd., Hyderabad (IN)

(72) Inventors: Sanjoy Ghosh, Hyderabad (IN); Vijay Krishnan, Hyderabad (IN); Vishnuchitam Acharyulu Podicheti, Hyderabad (IN); Nizamuddin MD, Hyderabad (IN)

(73) Assignee: Signode India Ltd., Hyderabad (IN)

( * ) Notice: Subject to any disclaimer, the term of this patent is extended or adjusted under 35 U.S.C. 154(b) by 375 days.

(21) Appl. No.: 18/043,647

(22) PCT Filed: Aug. 17, 2021

(86) PCT No.: PCT/IN2021/050791
§ 371 (c)(1),
(2) Date: Mar. 1, 2023

(87) PCT Pub. No.: WO2022/049593
PCT Pub. Date: Mar. 10, 2022

(65) Prior Publication Data

US 2023/0278075 A1 Sep. 7, 2023

(30) Foreign Application Priority Data

Sep. 4, 2020 (IN) ............................ 202041038238

(51) Int. Cl.
*B08B 6/00* (2006.01)
*B08B 1/12* (2024.01)
(Continued)

(52) U.S. Cl.
CPC ................ *B08B 1/12* (2024.01); *B08B 1/143* (2024.01); *B08B 1/20* (2024.01); *B08B 1/34* (2024.01);
(Continued)

(58) Field of Classification Search
CPC .............. B08B 1/20; B08B 5/043; B08B 6/00
(Continued)

(56) References Cited

U.S. PATENT DOCUMENTS 5,008,968 A * 4/1991 Preston .................... B08B 6/00 15/1.51
5,349,714 A 9/1994 Korbonski et al.
(Continued)

FOREIGN PATENT DOCUMENTS

EP 1317971 A2 6/2003
WO 2017155074 A1 9/2017

OTHER PUBLICATIONS

First Office Action and Search Report, from corresponding Chinese patent application No. 202180054035.1, with English machine translation, May 6, 2025.
(Continued)

*Primary Examiner* — Tom Rodgers
(74) *Attorney, Agent, or Firm* — Neal, Gerber & Eisenberg LLP

(57) ABSTRACT

Various embodiments of the present disclosure provide a multi-stage system and process for removing debris from plastic sheets (such as tier sheets or any other suitable sheets formed from any suitable material). Certain embodiments of the sheet-cleaning system (10) include a drive assembly comprising a drive roller (211, 212) driven by a drive actuator, an electrostatic-discharge device (220) operable to discharge static electricity, and a cleaning roller assembly (230) comprising a cleaning roller (231, 232) driven by a cleaning roller actuator, the cleaning roller (231, 232) comprising a cleaning implement on at least part of its outer surface.

15 Claims, 6 Drawing Sheets

(51) Int. Cl.

| | |
|---|---|
| ***B08B 1/14*** | (2024.01) |
| ***B08B 1/20*** | (2024.01) |
| ***B08B 1/34*** | (2024.01) |
| ***B08B 1/52*** | (2024.01) |
| ***B08B 1/54*** | (2024.01) |
| ***B08B 5/04*** | (2006.01) |

(52) U.S. Cl.
CPC .................. *B08B 1/52* (2024.01); *B08B 1/54* (2024.01); *B08B 5/043* (2013.01); *B08B 6/00* (2013.01)

(58) Field of Classification Search
USPC .................................................... 15/1.51, 179
See application file for complete search history.

(56) References Cited

U.S. PATENT DOCUMENTS

| | | | | | |
|---|---|---|---|---|---|
| 5,464,474 | A | * | 11/1995 | Nishimoto | B21B 45/0275 118/104 |
| 2006/0122047 | A1 | | 6/2006 | Phillips et al. | |

OTHER PUBLICATIONS

"International Search Report and Written Opinion", corresponding application PCT/IN2021/050791, Jan. 31, 2022.
"SortPro System", Sort Pro Services Holdings Inc., available at https://sortpro.net/product/sortpro/, before the priority date of this patent application.
"StackPro II System", Sort Pro Services Holdings Inc., available at https://sortpro.net/product/stackpro/, before the priority date of this patent application.

* cited by examiner

SYSTEM AND PROCESS FOR REMOVING DEBRIS FROM PLASTIC SHEETS

PRIORITY CLAIM

This is a national phase application of PCT/IN2021/050791, filed on Aug. 17, 2021, which claims priority to and the benefit of India Patent Application No. 202041038238, filed Sep. 4, 2020, the entire contents of which are incorporated herein by reference.

FIELD

The present disclosure relates to systems and processes for removing debris from plastic sheets.

BACKGROUND

Certain industries use tier sheets (also called separator sheets or layer pads) to separate layers of goods on pallets. Tier sheets help stabilize the palletized load, reduce contamination, and protect the goods during handling, storage, and transit. For instance, in preparation for shipping empty beverage containers to fillers, the beverage container manufacturer arranges tens or hundreds of containers (depending on the size) in distinct vertically stacked layers on a pallet, with each layer separated by a tier sheet. Tier sheets are typically made from fiberboard or thin plastic and are made in a variety of sizes (such as 40×48 inches, 44×56 inches, 44.75×47.5 inches, and 45×47.5 inches) and a variety of thicknesses (such as 0.025 to 0.1 inches). One benefit of plastic tier sheets is that they can be repeatedly cleaned and re-used, making them a cost-effective solution and reducing waste. There is a continuing need for effective systems and processes for cleaning plastic tier sheets to enable their continued reuse.

SUMMARY

Various embodiments of the present disclosure provide a multi-stage system and process for removing debris (such as dry dust particles) from plastic sheets (such as tier sheets or any other suitable sheets formed from any suitable material).

One embodiment of the sheet-cleaning system of the present disclosure comprises a drive assembly comprising a drive roller driven by a drive actuator; an electrostatic-discharge device operable to discharge static electricity; and a cleaning roller assembly comprising a cleaning roller driven by a cleaning-roller actuator, the cleaning roller comprising a cleaning implement on at least part of its outer surface.

One embodiment of the sheet-cleaning process of the present disclosure comprises discharging static electricity from the sheet; engaging the sheet with a cleaning implement of a cleaning roller; and vacuuming the sheet.

DETAILED DESCRIPTION

Figure 1:
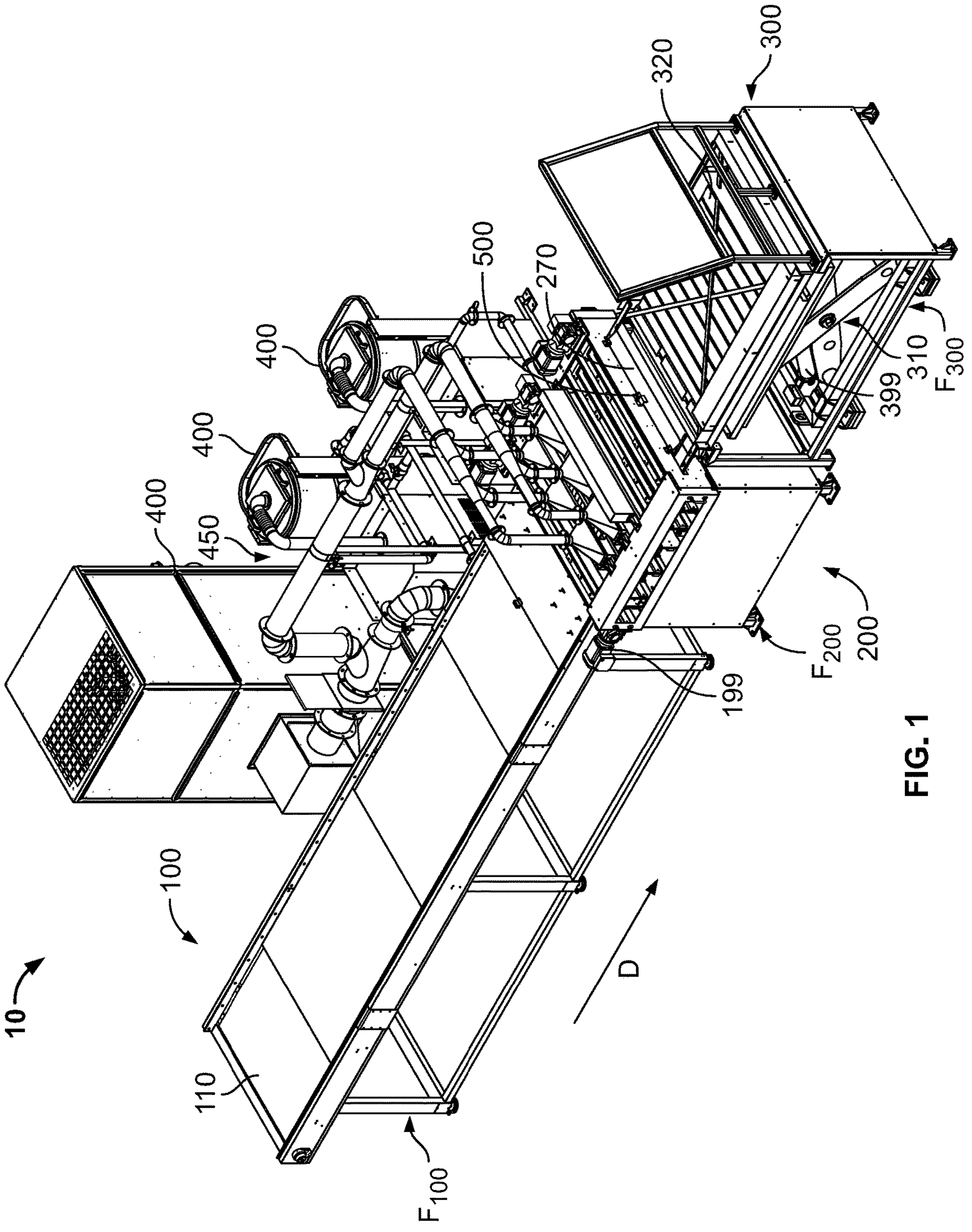
FIG. 1 is a perspective view of one example embodiment of the system of the present disclosure for removing debris from plastic sheets.

While the systems, devices, and processes described herein may be embodied in various forms, the drawings show and the specification describes certain exemplary and non-limiting embodiments. Not all of the components shown in the drawings and described in the specification may be required, and certain implementations may include additional, different, or fewer components. Variations in the arrangement and type of the components; the shapes, sizes, and materials of the components; and the manners of connection of the components may be made without departing from the spirit or scope of the claims. Unless otherwise indicated, any directions referred to in the specification reflect the orientations of the components shown in the corresponding drawings and do not limit the scope of the present disclosure. Further, terms that refer to mounting processes, such as coupled, mounted, connected, etc., are not intended to be limited to direct mounting processes, but should be interpreted broadly to include indirect and operably coupled, mounted, connected, and like mounting processes. This specification is intended to be taken as a whole and interpreted in accordance with the principles of the present disclosure and as understood by one of ordinary skill in the art.

Figure 2:
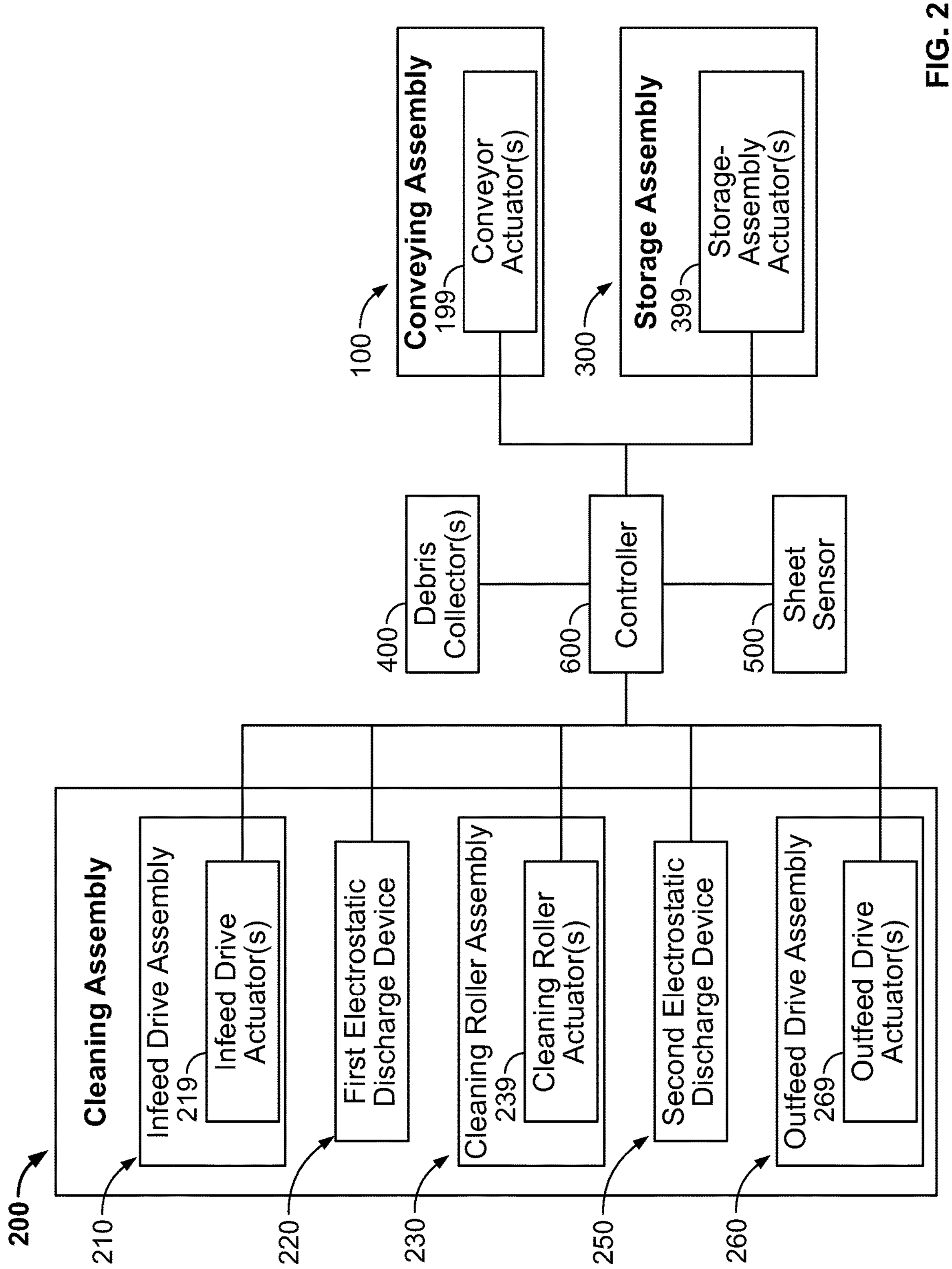
FIGS. 2 and 3 are block diagrams showing certain components of the system of FIG. 1.
Figure 3:
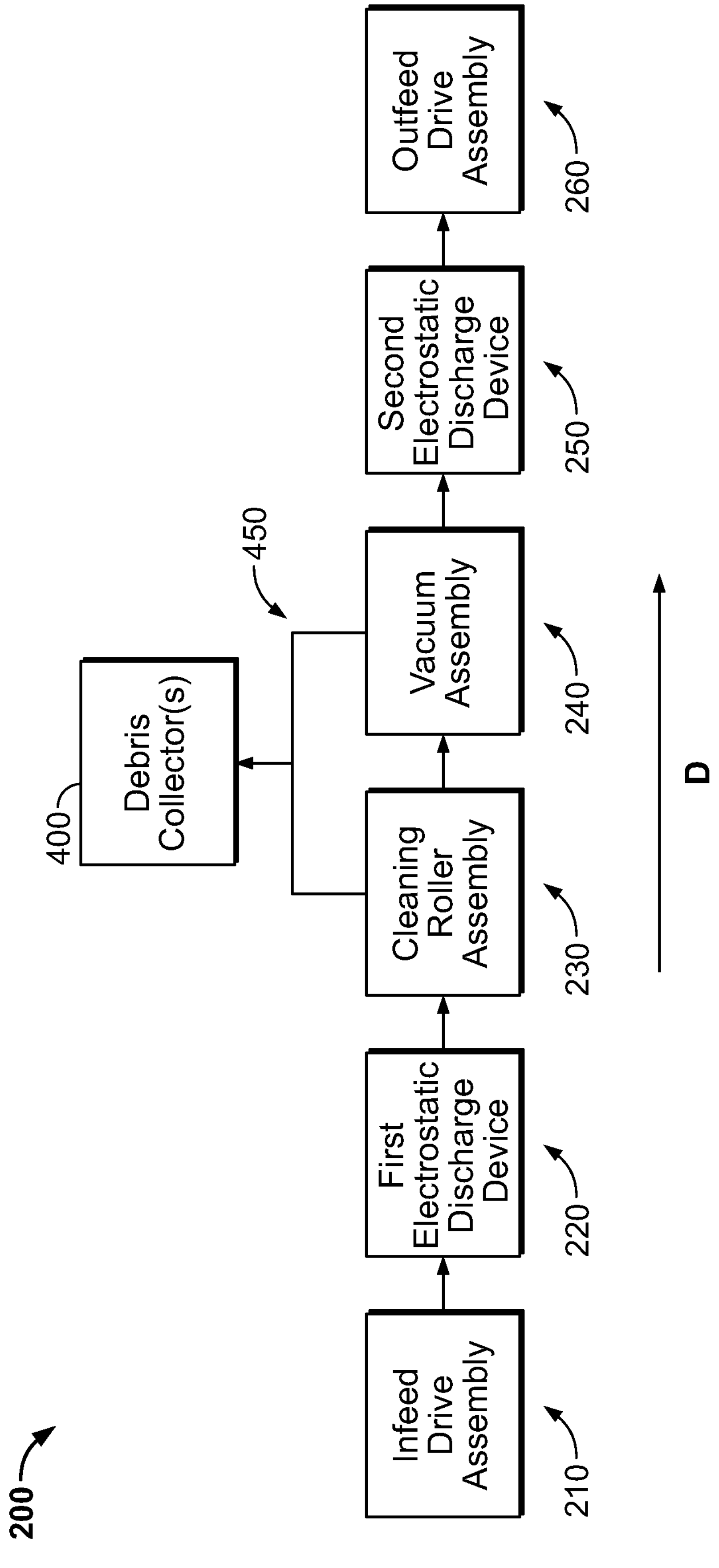

Various embodiments of the present disclosure provide a multi-stage system and process for removing debris (such as dry dust particles) from plastic sheets (such as tier sheets or any other suitable sheets formed from any suitable material). FIGS. 1-3 show one example embodiment of a sheet-cleaning system 10 (sometimes referred to below as the "system 10" for brevity) of the present disclosure and components thereof. The system 10 includes a conveying assembly 100, a cleaning assembly 200, a storage assembly 300, one or more debris collectors 400 (referred to in the singular below for clarity), ducting 450, a sheet sensor 500, and a controller 600. The sheet-movement direction D shown in FIGS. 3-5 reflects the direction a sheet (not shown) moves through the sheet-cleaning system 10. As used herein, "downstream" means in the sheet-movement direction D, and "upstream" means the direction opposite the sheet-movement direction D.

Generally, the conveying assembly 100 moves (dirty) sheets to the cleaning assembly 200. The cleaning assembly 200 uses rotating cleaning implements to remove debris from the sheets. The debris collector 400 continuously draws air and debris out of the cleaning assembly 200 via the ducting 450 and into the debris collector 400, where the debris is filtered from the air. The cleaning assembly 200 ejects the (clean) sheets onto the storage assembly 300, which stores the sheets for further processing.

The conveying assembly 100, which is best shown in FIGS. 1 and 2, delivers (dirty) sheets to the cleaning assembly 200 for cleaning. The conveying assembly 100 includes one or more conveyor actuators 199 (referred to in the singular below for clarity) operably connected to a conveyor 110 to drive the conveyor 110 to move sheets in the sheet-movement direction D. In this example embodiment, the conveyor actuator 199 includes a motor, the conveyor 110 includes an endless belt, and the conveyor actuator 199 is operably connected to the conveyor 110 via one or more other components, such as sprockets, gearing, screws, tensioning elements, and/or a chain. The conveyor actuator 199 may include any other suitable actuator in other embodiments. The conveyor 110 may include any other suitable component or components, such as rollers, in other embodiments. A conveying-assembly frame $F_{100}$ supports the conveyor 110 and the conveyor actuator 199. The conveying-assembly frame $F_{100}$ is formed from any suitable combination of solid members, tubular members, plates, and/or any other suitable components attached to one another.

Figure 4:
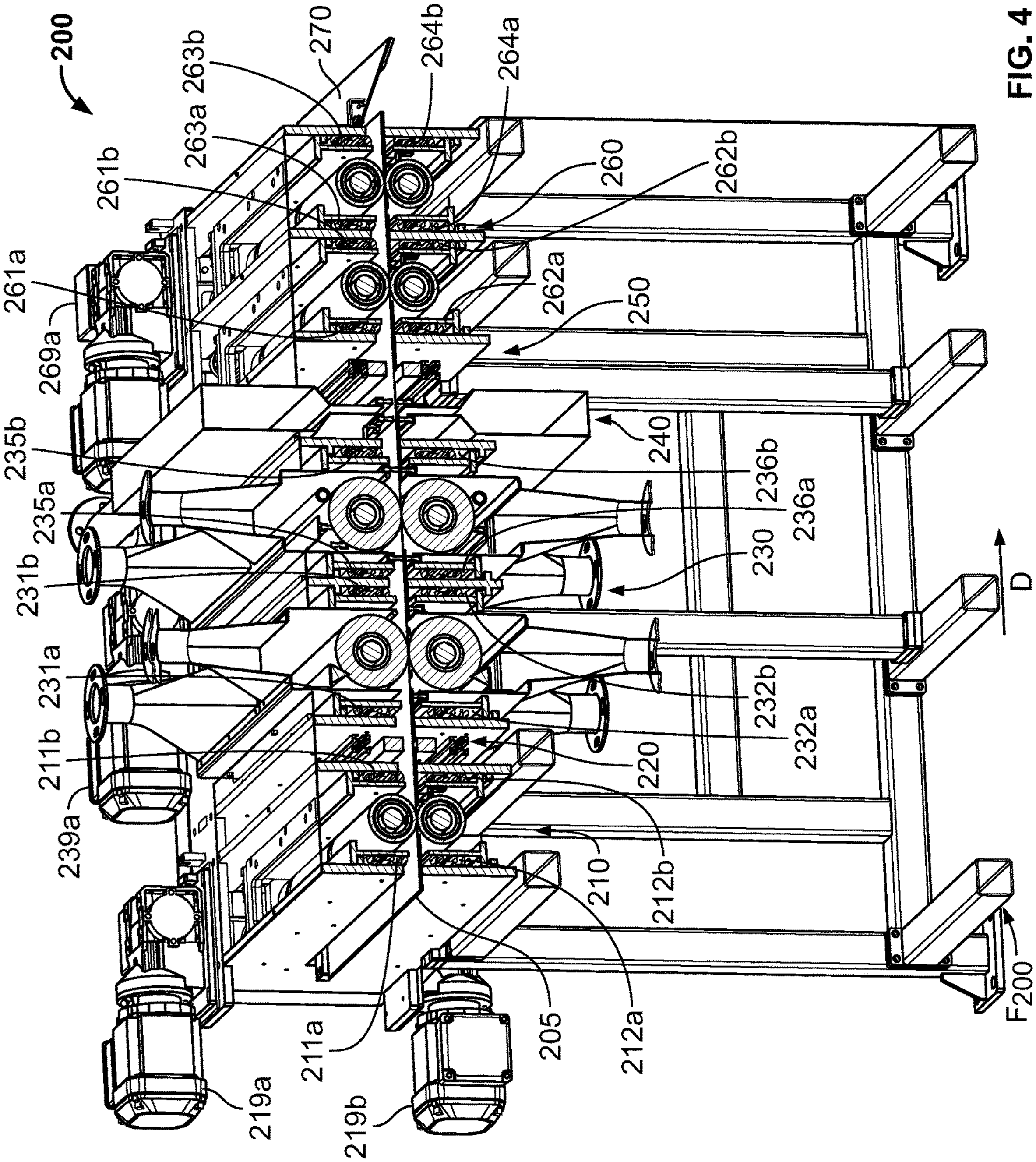
FIG. 4 is a cross-sectional perspective view of the cleaning assembly of the system of FIG. 1.
Figure 5:
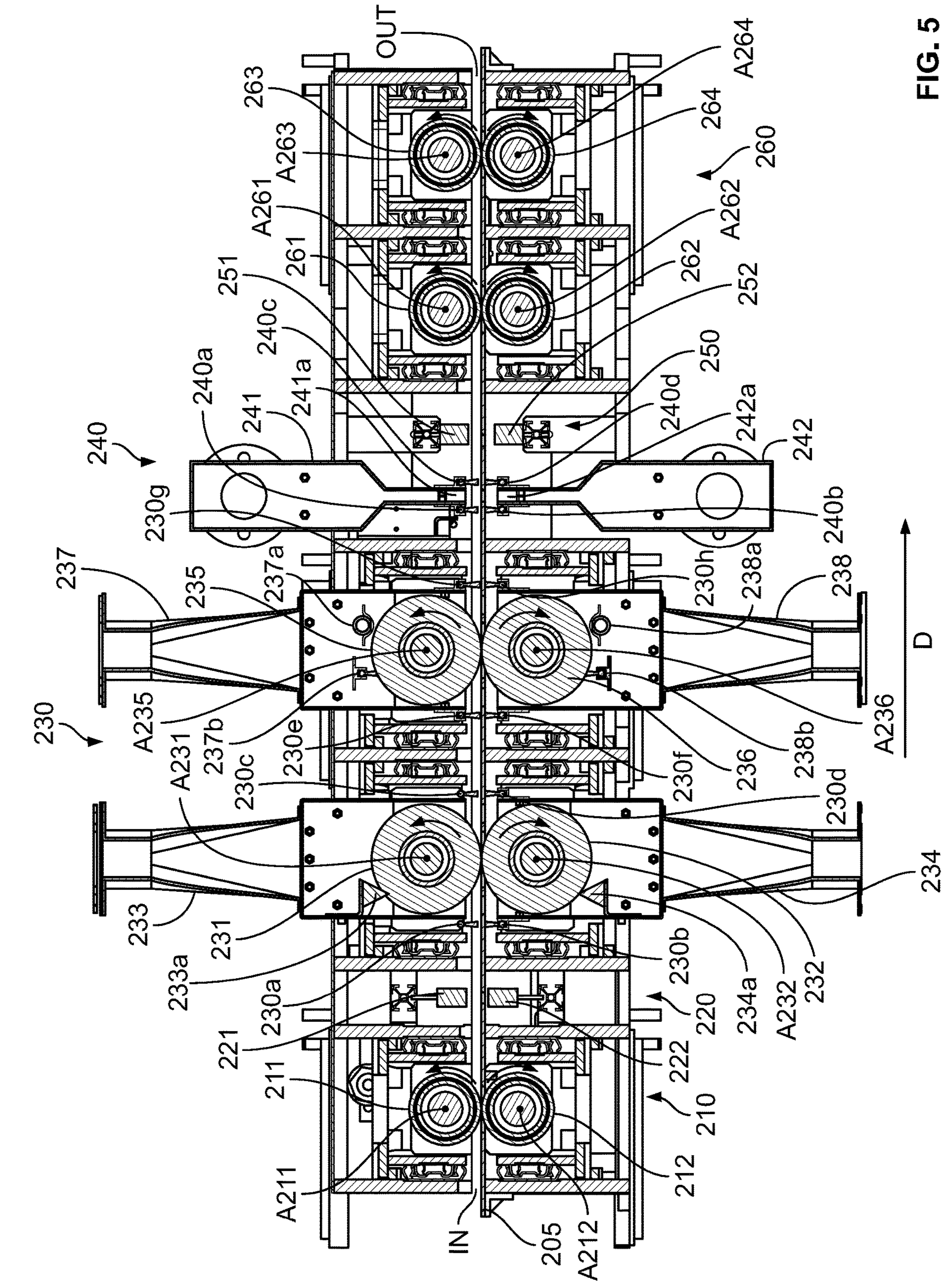
FIG. 5 is a cross-sectional elevational view of certain components of the cleaning assembly of FIG. 4.

The cleaning assembly 200, which is best shown in FIGS. 3-5, receives (dirty) sheets from the conveying assembly 100, cleans the sheets while moving them in the direction D, and delivers the (clean) sheets to the storage assembly 300. The cleaning assembly 200 includes a cleaning-assembly frame $F_{200}$, a sheet support 205, an infeed drive assembly 210, a first electrostatic-discharge device 220, a cleaning-roller assembly 230, a vacuum assembly 240, a second electrostatic-discharge device 250, an outfeed drive assembly 260, and an outfeed sheet cleaner 270. The cleaning assembly 200 has an infeed end adjacent the infeed drive assembly 210 and an outfeed end adjacent the outfeed drive assembly 260.

The cleaning-assembly frame $F_{200}$ supports and houses the sheet support 205, the infeed drive assembly 210, the first electrostatic-discharge device 220, the cleaning-roller assembly 230, the vacuum assembly 240, the second electrostatic-discharge device 250, the outfeed drive assembly 260, and the outfeed sheet cleaner 270. The cleaning-assembly frame $F_{200}$ is formed from any suitable combination of solid members, tubular members, plates, and/or any other suitable components attached to one another.

The sheet support 205 supports the sheet as it moves through the cleaning assembly 200. In this example embodiment, the sheet support 205 includes a plate (though it may be any other suitable component) mounted to the cleaning-assembly frame $F_{200}$ such that it separates certain upper and lower components of the infeed drive assembly 210, the first electrostatic-discharge device 220, the cleaning-roller assembly 230, the vacuum assembly 240, the second electrostatic-discharge device 250, and the outfeed drive assembly 260. Cutouts (not labeled) formed in the sheet support 205 enable these components to engage or otherwise interact with the sheet as it moves over the sheet support 205 and through the cleaning assembly 200. As shown in FIG. 5, the sheet support 205 and the cleaning-assembly frame $F_{200}$ together define sheet-infeed and sheet-outfeed slots IN and OUT at the respective infeed and outfeed ends of the cleaning assembly 200. These slots are sized so the sheet can pass through them to enter and exit the cleaning assembly 200.

The infeed drive assembly 210 receives the sheet from the conveying assembly 100 (via the sheet-infeed slot IN) and moves the sheet through the cleaning assembly 200. The infeed drive assembly 210 includes an upper infeed drive roller 211, a lower infeed drive roller 212, and one or more infeed drive actuators 219 (referred to in the singular below for clarity). The upper infeed drive roller 211 is mounted to the cleaning-assembly frame $F_{200}$ above the sheet support 205 via first and second rails 211*a* and 211*b* (FIG. 4), and the lower infeed drive roller 212 is mounted to the cleaning-assembly frame $F_{200}$ below the sheet support 205 and opposite the upper infeed drive roller 211 via first and second rails 212*a* and 212*b*. These rails are extendable such that the upper and lower infeed drive rollers 211 and 212 are movable relative to the cleaning-assembly frame $F_{200}$ in a direction transverse to (here, perpendicular to) the direction D between respective: (1) working positions within the cleaning-assembly frame $F_{200}$ (FIGS. 4 and 5); and (2) maintenance positions (not shown) partially or completely removed from the cleaning-assembly frame $F_{200}$ to enable the rollers to be cleaned, repaired, or replaced.

The upper and lower infeed drive rollers 211 and 212 are rotatable relative to the cleaning-assembly frame $F_{200}$ and the sheet support 205 about respective rotational axes $A_{211}$ and $A_{212}$. The infeed drive actuator 219 is operably connected to the upper and lower infeed drive rollers 211 and 212 and configured to rotate the upper and lower infeed drive rollers 211 and 212 in opposite directions about their respective rotational axes at a first rotational speed. In this example embodiment, the first rotational speed is 50 revolutions per minute, though it may be any suitable rotational speed in other embodiments.

In this example embodiment, at least one of the upper and lower infeed drive rollers 211 and 212 is repositionable relative to the cleaning-assembly frame $F_{200}$ and the sheet support 205 in the vertical direction (i.e., toward and away from the sheet support 205). This enables an operator to change the spacing between the upper and lower infeed drive rollers 211 and 212 to accommodate sheets of different thicknesses. In this example embodiment, the outer surfaces of the upper and lower infeed drive rollers 211 and 212 are coated in a relatively high-friction material, such as rubber, to aid in receiving the sheets and moving them through the cleaning assembly 200. The outer surfaces are textured in some embodiments. In this example embodiment, the infeed drive actuator 219 includes an electric motor, though it may include any other suitable actuator in other embodiments. The infeed drive actuator 219 is operably connected to the upper and lower infeed drive rollers 211 and 212 via one or more other components, such as sprockets, gearing, screws, tensioning elements, and/or chains.

The first electrostatic-discharge device 220 is downstream of the infeed drive assembly 210 and discharges static electricity from the sheet before the sheet enters the cleaning-roller assembly 230. This weakens or eliminates the bond between certain debris and the sheet, making it easier to remove the debris from the sheet. The first electrostatic-discharge device 220 includes upper and lower ionizing devices 221 and 222. The upper ionizing device 221 is mounted to the cleaning-assembly frame $F_{200}$ above the sheet support 205, and the lower ionizing device 222 is mounted to the cleaning-assembly frame $F_{200}$ below the sheet support 205 and opposite the upper ionizing device 211. In this example embodiment, the ionizing devices discharge numerous positive and negative ions onto the sheet. These ions are attracted to and neutralize ions on the sheet itself, thereby discharging any built-up static electricity on the sheet caused by the ions on the sheet. Other embodiments may include any other suitable type electrostatic-discharge device. Further embodiments do not include the first electrostatic-discharge device.

The cleaning-roller assembly 230 is downstream of the first electrostatic-discharge device 220 and cleans the sheet via two different sets of rollers. The cleaning-roller assembly 230 includes an upper first-stage cleaning roller 231; a lower first-stage cleaning roller 232; a first upper shroud 233; an upper first-stage cleaning roller cleaner 233*a*; a first lower shroud 234; a lower first-stage cleaning roller cleaner 234*a*; an upper second-stage cleaning roller 235; a lower second-stage cleaning roller 236; a second upper shroud 237; an upper cleaning nozzle 237*a*; an upper second-stage cleaning roller cleaner 237*b*; a second lower shroud 238; a lower cleaning nozzle 238*a*; a lower second-stage cleaning roller cleaner 238*b*; one or more cleaning-roller actuators 239

(referred to in the singular below for clarity); and brushes 230*a*, 230*b*, 230*c*, 230*d*, 230*e*, 230*f*, 230*g*, and 230*h*. In other embodiments the cleaning-roller assembly includes only one pair of cleaning rollers.

The upper first-stage cleaning roller 231 is mounted to the cleaning-assembly frame $F_{200}$ above the sheet support 205 via first and second rails 231*a* and 231*b* (FIG. 4), and the lower first-stage cleaning roller 232 is mounted to the cleaning-assembly frame $F_{200}$ below the sheet support 205 and opposite the upper first-stage cleaning roller 231 via first and second rails 232*a* and 232*b*. These rails are extendable such that the upper and lower first-stage cleaning rollers 231 and 232 are movable relative to the cleaning-assembly frame $F_{200}$ in a direction transverse to (here, perpendicular to) the direction D between respective: (1) working positions within the cleaning-assembly frame $F_{200}$ (FIGS. 4 and 5); and (2) maintenance positions (not shown) partially or completely removed from the cleaning-assembly frame $F_{200}$ to enable the rollers to be cleaned, repaired, or replaced. The upper and lower first-stage cleaning rollers 231 and 232 are rotatable relative to the cleaning-assembly frame $F_{200}$ and the sheet support 205 about respective rotational axes $A_{231}$ and $A_{232}$.

The cleaning-roller actuator 239 is operably connected to the upper and lower first-stage cleaning rollers 231 and 232 and configured to rotate the upper and lower first-stage cleaning rollers 231 and 232 in opposite directions about their respective rotational axes at a second rotational speed. In this example embodiment, the second rotational speed is greater than the first rotational speed at which the first and second infeed drive rollers 211 and 212 rotate (though in other embodiments it may be less than or equal to the first rotational speed). Here, the second rotational speed is 90 revolutions per minute (though it may be any suitable rotational speed in other embodiments).

In this example embodiment, at least one of the upper and lower first-stage cleaning rollers 231 and 232 is repositionable relative to the cleaning-assembly frame $F_{200}$ and the sheet support 205 in the vertical direction (i.e., toward and away from the sheet support 205). This enables an operator to change the spacing between the upper and lower first-stage cleaning rollers 231 and 232 to accommodate sheets of different thicknesses. In this example embodiment, the cleaning-roller actuator 239 includes an electric motor, though it may include any other suitable actuator in other embodiments. The cleaning-roller actuator 239 is operably connected to the upper and lower first-stage cleaning rollers 231 and 232 via one or more other components, such as sprockets, gearing, screws, tensioning elements, and/or chains.

The first upper shroud 233 is mounted to the cleaning-assembly frame $F_{200}$ such that it surrounds most of the upper first-stage cleaning roller 231. Similarly, the first lower shroud 234 is mounted to the cleaning-assembly frame $F_{200}$ such that it surrounds most of the lower first-stage cleaning roller 232. The first upper and first lower shrouds 233 and 234 are in fluid communication with the debris collector 400 (described below) such that the debris collector 400 draws air and debris out of the interior of the first upper and first lower shrouds 233 and 234.

In this example embodiment, the outer surfaces of the upper and lower first-stage cleaning rollers 231 and 232 include cleaning implements. In this example embodiment, the cleaning implements on the outer surfaces of both the upper and lower first-stage cleaning rollers 231 and 232 include bristles (and specifically, 0.5 millimeter diameter nylon bristles). As the upper and lower first-stage cleaning rollers 231 and 232 rotate, the bristles engage the sheet and either loosen debris on the sheet or remove debris from the sheet. The debris collector 400 draws any removed debris into and then out of the first upper and/or the first lower shrouds 233 and 234 and into the ducting 450. In other embodiments, the upper first-stage cleaning roller 231 includes a different cleaning implement than the lower first-stage cleaning roller 232.

The cleaning roller cleaners are configured to remove debris from the first-stage cleaning rollers as the first-stage cleaning rollers rotate. The upper first-stage cleaning roller cleaner 233*a* is mounted within the first upper shroud 233 in the rotational path of the cleaning implement of the upper first-stage cleaning roller 231. As the upper first-stage cleaning roller 231 rotates, the cleaning implement (here, the bristles) engages the upper first-stage cleaning roller cleaner 233*a* (here a baffle plate). This interaction removes debris from the cleaning implement into the air within the interior of the first upper shroud 233, and the debris collector 400 then draws the debris out of the first upper shroud 233 and into the ducting 450. Similarly, the lower first-stage cleaning roller cleaner 234*a* is mounted within the first lower shroud 234 in the rotational path of the cleaning implement of the lower first-stage cleaning roller 232. As the lower first-stage cleaning roller 232 rotates, the cleaning implement (here, the bristles) engages the lower first-stage cleaning roller cleaner 234*a* (here a baffle plate). This interaction removes debris from the cleaning implement into the air within the interior of the first lower shroud 234, and the debris collector 400 then draws the debris out of the first lower shroud 234 and into the ducting 450.

The brushes 230*a* and 230*b* are mounted to the cleaning-assembly frame $F_{200}$ above and below the sheet support 205, respectively, downstream of the first electrostatic-discharge device 220 and upstream of the upper and lower first-stage cleaning rollers 231 and 232. Brushes 230*c* and 230*d* are mounted to the cleaning-assembly frame $F_{200}$ above and below the sheet support 205, respectively, downstream of the upper and lower first-stage cleaning rollers 231 and 232. These brushes are positioned to engage the upper and lower surfaces of the sheet to loosen debris on the sheet or remove debris from the sheet as it moves past the brushes. Although described as brushes, they may be any suitable type of cleaning implement.

The upper second-stage cleaning roller 235 is mounted to the cleaning-assembly frame $F_{200}$ above the sheet support 205 via first and second rails 235*a* and 235*b* (FIG. 4), and the lower second-stage cleaning roller 236 is mounted to the cleaning-assembly frame $F_{200}$ below the sheet support 205 and opposite the upper second-stage cleaning roller 235 via first and second rails 236*a* and 236*b*. These rails are extendable such that the upper and lower second-stage cleaning rollers 235 and 236 are movable relative to the cleaning-assembly frame $F_{200}$ in a direction transverse to (here, perpendicular to) the direction D between respective: (1) working positions within the cleaning-assembly frame $F_{200}$ (FIGS. 4 and 5); and (2) maintenance positions (not shown) partially or completely removed from the cleaning-assembly frame $F_{200}$ to enable the rollers to be cleaned, repaired, or replaced. The upper and lower second-stage cleaning rollers 236 and 236 are rotatable relative to the cleaning-assembly frame $F_{200}$ and the sheet support 205 about respective rotational axes $A_{235}$ and $A_{236}$.

The cleaning-roller actuator 239 is operably connected to the upper and lower second-stage cleaning rollers 235 and 236 and configured to rotate the upper and lower second-stage cleaning rollers 235 and 236 in opposite directions about their respective rotational axes at the second rotational speed.

In this example embodiment, at least one of the upper and lower second-stage cleaning rollers 235 and 236 is repositionable relative to the cleaning-assembly frame $F_{200}$ and the sheet support 205 in the vertical direction (i.e., toward and away from the sheet support 205). This enables an operator to change the spacing between the upper and lower second-stage cleaning rollers 235 and 236 to accommodate sheets of different thicknesses. The cleaning-roller actuator 239 is operably connected to the upper and lower second-stage cleaning rollers 235 and 236 via one or more other components, such as sprockets, gearing, screws, tensioning elements, and/or chains.

The second upper shroud 237 is mounted to the cleaning-assembly frame $F_{200}$ such that it surrounds most of the upper second-stage cleaning roller 235. Similarly, the second lower shroud 238 is mounted to the cleaning-assembly frame $F_{200}$ such that it surrounds most of the lower second-stage cleaning roller 236. The second upper and second lower shrouds 237 and 238 are in fluid communication with the debris collector 400 (described below) such that the debris collector 400 draws air and debris out of the interior of the second upper and first lower shrouds 237 and 238.

In this example embodiment, the outer surfaces of the upper and lower second-stage cleaning rollers 235 and 236 include cleaning implements. In this example embodiment, the cleaning implements on the outer surfaces of both the upper and lower second-stage cleaning rollers 235 and 236 include a fabric covering (and specifically, fine cotton fabric). As the upper and lower second-stage cleaning rollers 235 and 236 rotate, the fabric engages the sheet and either loosens debris on the sheet or removes debris from the sheet. The debris collector 400 draws any removed debris into and then out of the second upper and/or the second lower shrouds 237 and 238 and into the ducting 450. In other embodiments, the upper second-stage cleaning roller 235 includes a different cleaning implement than the lower second-stage cleaning roller 236. While in this embodiment the upper and lower first-stage cleaning rollers have different cleaning implements than the upper and lower second-stage cleaning rollers, in other embodiments all four cleaning rollers have the same cleaning implement.

The nozzles and cleaning roller cleaners are configured to remove debris from the second-stage cleaning rollers as the second-stage cleaning rollers rotate. The upper cleaning nozzle 237*a* is mounted within the second upper shroud 237 such that air emitted from the upper cleaning nozzle 237*a* is in the rotational path of the cleaning implement of the upper second-stage cleaning roller 235. Similarly, the upper second-stage cleaning roller cleaner 237*b* is mounted within the second upper shroud 237 in the rotational path of the cleaning implement of the upper second-stage cleaning roller 235. As the upper second-stage cleaning roller 235 rotates: (1) air emitted from the upper cleaning nozzle 237*a* impinges on the cleaning implement (here, the fabric) of the roller to loosen or remove debris from the cleaning implement into the air within the interior of the second upper shroud 237; and (2) the cleaning implement (here, the fabric) then engages the upper second-stage cleaning roller cleaner 237*a* (here a baffle plate), which removes debris from the cleaning implement into the air within the interior of the second upper shroud 237. The debris collector 400 draws this debris out of the second upper shroud 237 and into the ducting 450.

Similarly, the lower cleaning nozzle 238*a* is mounted within the second lower shroud 238 such that air emitted from the lower cleaning nozzle 238*a* is in the rotational path of the cleaning implement of the lower second-stage cleaning roller 236. Similarly, the lower second-stage cleaning roller cleaner 238*b* is mounted within the second lower shroud 238 in the rotational path of the cleaning implement of the lower second-stage cleaning roller 236. As the lower second-stage cleaning roller 236 rotates: (1) air emitted from the lower cleaning nozzle 238*a* impinges on the cleaning implement (here, the fabric) of the roller to loosen or remove debris from the cleaning implement into the air within the interior of the second lower shroud 238; and (2) the cleaning implement (here, the fabric) then engages the lower second-stage cleaning roller cleaner 238*a* (here a baffle plate), which removes debris from the cleaning implement into the air within the interior of the second lower shroud 238. The debris collector 400 draws this debris out of the second lower shroud 238 and into the ducting 450.

The brushes 230*e* and 230*f* are mounted to the cleaning-assembly frame $F_{200}$ above and below the sheet support 205, respectively, downstream of the brushes 230*c* and 230*d* and upstream of the upper and lower second-stage cleaning rollers 235 and 236. Brushes 230*g* and 230*h* are mounted to the cleaning-assembly frame $F_{200}$ above and below the sheet support 205, respectively, upper and lower second-stage cleaning rollers 235 and 236. These brushes are positioned to engage the upper and lower surfaces of the sheet to loosen debris on the sheet or remove debris from the sheet as it moves past the brushes. Although described as brushes, they may be any suitable type of cleaning implement.

The vacuum assembly 240 is downstream of the cleaning roller assembly 230 and removes loosened debris remaining on the sheet after the sheet passes through the cleaning-roller assembly 230. The vacuum assembly 240 includes an upper vacuum housing 241 having an inlet 241*a*; an opposing lower vacuum housing 242 having an inlet 242*a*; and brushes 240*a*, 240*b*, 240*c*, and 240*d*. The upper vacuum housing 241 is mounted to the cleaning-assembly frame $F_{200}$ above the sheet support 205, and the lower vacuum housing 242 is mounted to the cleaning-assembly frame $F_{200}$ below the sheet support 205. The upper and lower vacuum housings 241 and 242 are positioned such that their respective inlets 241*a* and 242*a* are opposite one another and slightly spaced-apart from the sheet (when the sheet is passing through the vacuum assembly 240). The upper and lower vacuum housings 241 and 242 are in fluid communication with the debris collector 400 such that the debris collector 400 draws air and debris out of the interiors of the upper and lower vacuum housings 241 and 242 and into the ducting 450.

The brushes 240*a* and 240*b* are mounted to the cleaning-assembly frame $F_{200}$ above and below the sheet support 205, respectively, downstream of the brushes 230*g* and 230*h* and upstream of the inlets 241*a* and 242*a* of the upper and lower vacuum housings 241 and 242. The brushes 240*c* and 240*d* are mounted to the cleaning-assembly frame $F_{200}$ above and below the sheet support 205, respectively, downstream of the inlets 241*a* and 242*a* of the upper and lower vacuum housings 241 and 242. These brushes are positioned to engage the upper and lower surfaces of the sheet to loosen debris on the sheet or remove debris from the sheet as it moves past the brushes. Although described as brushes, they may be any suitable type of cleaning implement.

The second electrostatic-discharge device 250 is downstream of the vacuum assembly 240 and discharges static electricity from the sheet before the sheet exits the cleaning assembly 200. This reduces the likelihood that the sheets will stick together when stacked in the storage assembly 300 after cleaning. The second electrostatic-discharge device 250 includes upper and lower ionizing devices 251 and 252. The upper ionizing device 251 is mounted to the cleaning-assembly frame $F_{200}$ above the sheet support 205, and the lower ionizing device 252 is mounted to the cleaning-assembly frame $F_{200}$ below the sheet support 205 and opposite the upper ionizing device 251. In this example embodiment, the ionizing devices discharge numerous positive and negative ions onto the sheet. These ions are attracted to and neutralize ions on the sheet itself, thereby discharging any built-up static electricity on the sheet caused by the ions on the sheet. Other embodiments may include any other suitable type or electrostatic-discharge device. Further embodiments do not include the second electrostatic-discharge device.

The outfeed drive assembly 260 is downstream of the second electrostatic-discharge device 250 and ejects the sheet from the cleaning assembly 200 (via the sheet-outfeed slot OUT) to the storage assembly 300. The outfeed drive assembly 210 includes a first upper outfeed drive roller 261, a first lower outfeed drive roller 262, a second upper outfeed drive roller 263, a second upper outfeed drive roller 264, and one or more outfeed drive actuators 269 (referred to in the singular below for clarity).

The first upper outfeed drive roller 261 is mounted to the cleaning-assembly frame $F_{200}$ above the sheet support 205 via first and second rails 261*a* and 261*b* (FIG. 4), and the first lower outfeed drive roller 262 is mounted to the cleaning-assembly frame $F_{200}$ below the sheet support 205 and opposite the first upper infeed drive roller 261 via first and second rails 262*a* and 262*b*. These rails are extendable such that the first upper and lower outfeed drive rollers 261 and 262 are movable relative to the cleaning-assembly frame $F_{200}$ in a direction transverse to (here, perpendicular to) the direction D between respective: (1) working positions within the cleaning-assembly frame $F_{200}$ (FIGS. 4 and 5); and (2) maintenance positions (not shown) partially or completely removed from the cleaning-assembly frame $F_{200}$ to enable the rollers to be cleaned, repaired, or replaced. The first upper and first lower outfeed drive rollers 261 and 262 are rotatable relative to the cleaning-assembly frame $F_{200}$ and the sheet support 205 about respective rotational axes $A_{261}$ and $A_{262}$.

The second upper outfeed drive roller 263 is mounted to the cleaning-assembly frame $F_{200}$ above the sheet support 205 and downstream of the first upper outfeed drive roller 261 via first and second rails 263*a* and 263*b* (FIG. 4), and the second lower outfeed drive roller 264 is mounted to the cleaning-assembly frame $F_{200}$ below the sheet support 205 downstream of the first lower outfeed drive roller 262 and opposite the second upper infeed drive roller 263 via first and second rails 264*a* and 264*b*. These rails are extendable such that the second upper and lower outfeed drive rollers 263 and 264 are movable relative to the cleaning-assembly frame $F_{200}$ in a direction transverse to (here, perpendicular to) the direction D between respective: (1) working positions within the cleaning-assembly frame $F_{200}$ (FIGS. 4 and 5); and (2) maintenance positions (not shown) partially or completely removed from the cleaning-assembly frame $F_{200}$ to enable the rollers to be cleaned, repaired, or replaced. The second upper and first lower outfeed drive rollers 263 and 264 are rotatable relative to the cleaning-assembly frame $F_{200}$ and the sheet support 205 about respective rotational axes $A_{263}$ and $A_{264}$.

The outfeed drive actuator 269 is operably connected to the first upper and lower outfeed drive rollers 261 and 262 and configured to rotate the first upper and lower outfeed drive rollers 261 and 262 in opposite directions about their respective rotational axes at a third rotational speed. Similarly, the outfeed drive actuator 269 is operably connected to the second upper and lower outfeed drive rollers 263 and 264 and configured to rotate these outfeed drive rollers in opposite directions about their respective rotational axes at the third rotational speed. In this example embodiment, the third rotational speed is greater than the first rotational speed at which the infeed drive rollers 211 and 212 rotate and less than the second rotational speed at which the cleaning rollers 231, 232, 235, and 236 rotate (though in other embodiments it may be greater than, less than, or equal to the first rotational speed and/or the second rotational speed). Here, the third rotational speed is 60 revolutions per minute (though it may be any suitable rotational speed in other embodiments).

In this example embodiment, at least one of the first upper and lower outfeed drive rollers 261 and 262 is repositionable relative to the cleaning-assembly frame $F_{200}$ and the sheet support 205 in the vertical direction (i.e., toward and away from the sheet support 205). This enables an operator to change the spacing between the first upper and lower outfeed drive rollers 261 and 262 to accommodate sheets of different thicknesses. Similarly, at least one of the second upper and lower outfeed drive rollers 263 and 264 is repositionable relative to the cleaning-assembly frame $F_{200}$ and the sheet support 205 in the vertical direction (i.e., toward and away from the sheet support 205). This enables an operator to change the spacing between the second upper and lower outfeed drive rollers 263 and 264 to accommodate sheets of different thicknesses. In this example embodiment, the outer surfaces of the first and second upper and lower outfeed drive rollers 261-264 are coated in a relatively high-friction material, such as rubber, to aid in receiving the sheets and discharging them from the cleaning assembly 200. The outer surfaces are textured in some embodiments. In this example embodiment, the outfeed drive actuator 269 includes an electric motor, though it may include any other suitable actuator in other embodiments. The outfeed drive actuator 269 is operably connected to the first and second upper and lower outfeed drive rollers 261-264 via one or more other components, such as sprockets, gearing, screws, tensioning elements, and/or chains. In other embodiments the outfeed drive assembly includes only one pair of outfeed drive rollers.

The outfeed sheet cleaner 270 is downstream of the outfeed drive assembly 260 and removes loose debris from the sheet as the sheet exits the cleaning assembly 200. In this example embodiment, the outfeed sheet cleaner 270 comprises a microfiber pad mounted to the cleaning-assembly frame $F_{200}$ adjacent the sheet-outfeed slot OUT. The outfeed sheet cleaner 270 is positioned to engage the upper and lower surfaces of the sheet as the sheet exits the sheet-outfeed slot OUT and remove loose debris from the sheet as the sheet moves past the outfeed sheet cleaner 270.

The storage assembly 300, which is best shown in FIGS. 1 and 2, receives (clean) sheets from the cleaning assembly 200 and stores them for further processing, storage, and transport. The storage assembly 300 includes one or more storage-assembly actuators 399 (referred to in the singular below for clarity) operably connected to a lift 310 (here a scissor lift) that is operatively connected to a storage table 320 and configured to raise and lower the storage table 320 in response to sheets being loaded onto or off of the storage table 320 (as described in more detail below). A storage-assembly frame $F_{300}$ supports these components and is formed from any suitable combination of solid members, tubular members, plates, and/or any other suitable components attached to one another. In this example embodiment, the storage-assembly actuator 399 includes a hydraulic cylinder, though it may include any other suitable actuator (such as an electric motor or a pneumatic cylinder) in other embodiments.

The debris collector 400 includes a housing (not labeled) defining an inlet and an outlet, one or more filters (not shown) within the housing, an impeller within the housing, and a motor operably connected to the impeller to rotate the impeller. The inlet of the debris collector is in fluid communication with components of the cleaning assembly 200 (as described above) via the ducting 450. The components of the debris collector are sized, shaped, positioned, and otherwise configured such that, when the debris collector is operating and the impeller is rotating, the impeller draws air (and debris) from the cleaning assembly 200 into the inlet of the housing (via the ducting 450), draws the air through the one or more filters—which capture debris and remove it from the air—and expels the air from the housing through the outlet, which is typically open to the surrounding atmosphere.

The sheet sensor 500 is any suitable type of sensor configured to detect the sheet when the sheet is ejected from the cleaning assembly 200 and onto the storage assembly 300 and to send a corresponding signal to the controller 600. In this example embodiment, the sheet sensor 500 includes an optical sensor mounted to the cleaning-assembly frame $F_{200}$ adjacent the sheet-outfeed slot OUT, though the sheet sensor 500 may be mounted in any suitable position that enables the sheet sensor 500 to detect sheets.

The controller 600 includes a processing device (or devices) communicatively connected to a memory device (or devices). For instance, the controller may include a programmable logic controller. The processing device may include any suitable processing device such as, but not limited to, a general-purpose processor, a special-purpose processor, a digital-signal processor, one or more microprocessors, one or more microprocessors in association with a digital-signal processor core, one or more application-specific integrated circuits, one or more field-programmable gate array circuits, one or more integrated circuits, and/or a state machine. The memory device may include any suitable memory device such as, but not limited to, read-only memory, random-access memory, one or more digital registers, cache memory, one or more semiconductor memory devices, magnetic media such as integrated hard disks and/or removable memory, magneto-optical media, and/or optical media. The memory device stores instructions executable by the processing device to control operation of the system 10 (such as to carry out the process 900 described below with respect to FIG. 6).

As shown in FIG. 2, the controller 600 is communicatively and operably connected to the conveyor actuator 199, the infeed drive actuator 219, the first electrostatic-discharge device 220, the cleaning roller actuator 239, the second electrostatic-discharge device 250, the outfeed drive actuator 269, the storage-assembly actuator 399, and the debris collector 400 and configured to receive signals from and to control those components. The controller 600 is communicatively connected to the sheet sensor 500 to receive signals from the sheet sensor 500.

Figure 6:
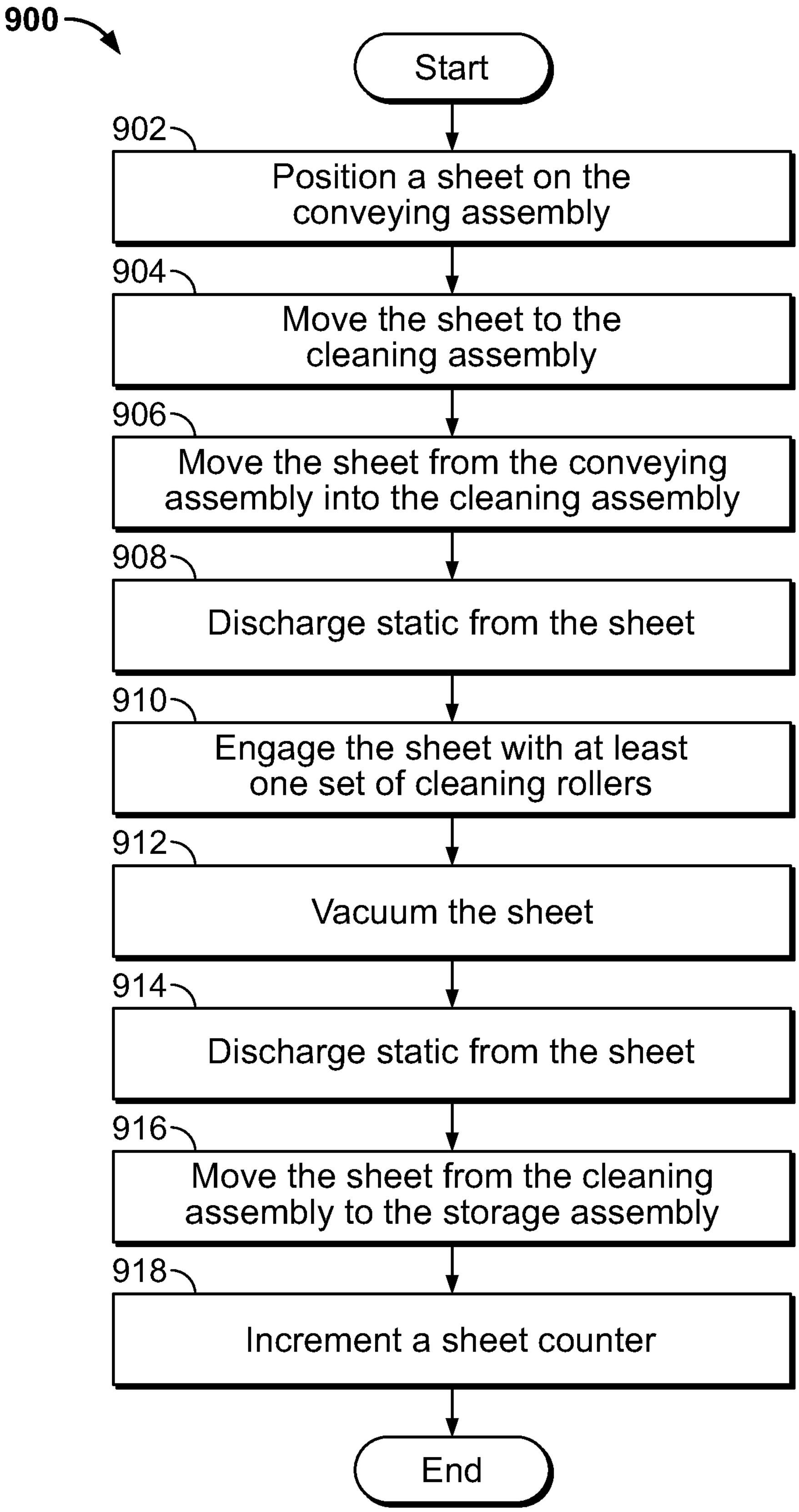
FIG. 6 is a flowchart showing one example embodiment of the process of the present disclosure for removing debris from plastic sheets.

FIG. 6 shows a process 900 for cleaning a dirty sheet. The dirty sheet is positioned on the conveying assembly, as block 902 indicates, and moved to the cleaning assembly, as block 904 indicates. The sheet is then moved from the conveying assembly into the cleaning assembly, as block 906 indicates. Static electricity is discharged from the sheet, as block 908 indicates, and at least one set of cleaning rollers engage the sheet, as block 910 indicates. The sheet is vacuumed, as block 912 indicates, and static electricity is again discharged from the sheet, as block 914 indicates. The sheet is moved from the cleaning assembly to the storage assembly, as block 916 indicates. A sheet counter is incremented, as block 918 indicates, and the process 900 ends for that sheet.

Operation of the system 10 to carry out the process 900 for a dirty sheet (not shown) is now described. Initially: the conveyor actuator 199 is driving the conveyor 110; the infeed drive actuator 219 is driving the infeed drive rollers 211 and 212; the first electrostatic-discharge device 220 is operating; the cleaning roller actuator 239 is driving the cleaning rollers 231, 232, 235, and 236; the second electrostatic-discharge device 250 is operating, the outfeed drive actuator 269 is driving the outfeed drive rollers 261, 262, 263, and 264; the debris collector 400 is operating; and the storage assembly 300 is not storing any sheets.

To clean the dirty sheet, an operator positions the sheet on the conveyor 110 of the conveying assembly 100. The conveyor actuator 199 drives the conveyor 110 to move the sheet in the sheet-movement direction toward the cleaning assembly 200 and into the sheet-infeed slot IN. The infeed drive rollers 211 and 212 engage the sheet and move the sheet in the sheet-movement direction D. The sheet passes between the upper and lower ionizing devices 221 and 222 of the first electrostatic-discharge device 220. This discharges static electricity from the sheet, thereby weakening (or eliminating) the bond between certain debris and the sheet.

The infeed drive rollers 211 and 212 continue moving the sheet in the direction D so it passes through and is cleaned by the cleaning-roller assembly 230. Specifically, the sheet first passes between the first-stage cleaning rollers 231 and 232, which engage the sheet with their respective cleaning implements (here, bristles) and loosen or remove debris from the sheet. The debris collector 400 draws removed debris into and from the first upper and first lower shrouds 233 and 234 and into the ducting 450. The first sheet then passes between the second-stage cleaning rollers 235 and 236, which engage the sheet with their respective cleaning implements and loosen or remove debris from the sheet. The debris collector 400 draws removed debris into and from the upper and lower second shrouds 237 and 238 and into the ducting 450.

The infeed drive rollers 211 and 212 continue moving the sheet in the sheet-movement direction D so it passes through the vacuum assembly 240, wherein the debris collector 400 draws loose debris from the sheet and into the ducting 450. The infeed drive rollers 211 and 212 continue moving the sheet in the sheet-movement direction D so it passes between the upper and lower ionizing devices 251 and 252 of the second electrostatic-discharge device 250. This discharges static electricity from the sheet.

The sheet then moves between and is engaged by the first outfeed drive rollers 261 and 262 and then the second outfeed drive rollers 263 and 264. The outfeed drive rollers 261-264 engage the sheet and move the sheet in the direction D so the sheet is ejected from the sheet-outfeed slot OUT of the cleaning assembly 200 and onto the storage tray 320 of the storage assembly 300. As this occurs, the outfeed sheet cleaner 270 wipes the sheet to remove any remaining loose debris, and the sheet sensor 500 detects the sheet exiting the cleaning assembly 200 and sends a corresponding signal to the controller 600. In response, the controller 600 controls the storage-assembly actuator 399 to operate the lift 310 to slightly lower the storage tray 320 so the sheet does not block the sheet-outfeed slot OUT, which makes room for the storage tray 320 to receive the next sheet.

In certain embodiments, the cleaning assembly is configured to automatically adjust to sheets of varying thicknesses. In these embodiments, the cleaning assembly includes one or more height-adjusting actuators operably connected to the rollers of the cleaning assembly. The controller is operably connected to the one or more height-adjusting actuators and configured to operate the one or more height-adjusting actuators to move the rollers to accommodate for a sheet of different thickness. For instance, if the rollers are at a height appropriate to clean a 0.025 inch thick sheet and the next sheet to-be-cleaned is 0.1 inches thick, the controller controls the one or more height-adjusting actuators to move one or more of the rollers further from the sheet support to accommodate the thicker sheet. In some of these embodiments, the sheet-cleaning system includes a sheet-thickness sensor configured to detect the thickness of the sheet before or as the sheet enters the cleaning assembly and to send a corresponding signal to the controller. The controller is configured to determine the thickness of the sheet based on that signal, and if necessary control the one or more height-adjusting actuators to adjust the height of the rollers.

In various embodiments, the sheet-cleaning system includes an on/off sensor configured to detect a sheet before or as the sheet enters the cleaning assembly. The on/off sensor is configured to generate and send an appropriate signal to the controller upon detecting the sheet, and in response the controller is configured to activate the debris collector and the various components and actuators of the cleaning assembly so the cleaning assembly cleans the sheet. After a designated period of time expires without the on/off sensor having detected a sheet, the controller is configured to deactivate the debris collector and the various components and actuators of the cleaning assembly, which conserves electricity (thereby saving money) and reduces wear on the components.

The various components of the cleaning assembly are shown in the Figures and described above as being positioned in a particular order with respect to the downstream direction D. This is merely one example ordering of these components, and in other embodiments the components may be arranged in any other suitable order.

In the embodiment of the sheet-cleaning system described above and shown in the Figures, the sheets are oriented generally horizontally (i.e., parallel to the floor) when moving through the sheet-cleaning system. In other embodiments, the sheet-cleaning system is oriented so the sheets are oriented generally vertically (i.e., perpendicular to the floor) when moving through the sheet-cleaning system.

In the embodiment of the sheet-cleaning system described above and shown in the Figures, no liquid is used to remove debris from or otherwise clean the sheets, though in other embodiments the sheet-cleaning system may incorporate liquid to remove debris from the sheets.

The invention claimed is:

1. A sheet-cleaning system comprising:

a drive assembly comprising a drive roller driven by a drive actuator;

a sheet support, having an upper surface and an opposing lower surface, wherein the upper surface is configured to support a sheet;

an electrostatic-discharge device operable to discharge static electricity;

a driven cleaning roller comprising a cleaning implement on at least part of an outer surface of the cleaning roller, wherein the cleaning roller is downstream of the electrostatic-discharge device;

a vacuum housing, having an inlet downstream of the cleaning roller and facing the upper surface of the sheet support;

a debris collector in fluid communication with the vacuum housing and configured to draw air through the inlet and into the vacuum housing;

an upstream cleaning implement upstream of the inlet of the vacuum housing and downstream of the cleaning roller and positioned to engage a sheet on the upper surface of the sheet support; and a downstream cleaning implement immediately downstream of the inlet of the vacuum housing and positioned to engage the sheet on the upper surface of the sheet support.

2. The sheet-cleaning system of claim 1, wherein at least one of the cleaning implements comprises one of: a brush and a fabric pad.

3. The sheet-cleaning system of claim 1, further comprising:

a conveying assembly upstream of the drive roller, the conveying assembly comprising a conveyor driven by at least one conveyor actuator; and a storage assembly downstream of the cleaning roller and comprising a storage tray.

4. The sheet-cleaning system of claim 1, wherein the electrostatic-discharge device is a first electrostatic-discharge device, wherein the downstream cleaning implement is a second electrostatic-discharge device.

5. The sheet-cleaning system of claim 1, wherein the cleaning roller comprises a first-stage cleaning roller, wherein the cleaning implement of the first-stage cleaning roller comprises a first cleaning implement, wherein the upstream cleaning implement is a driven second-stage cleaning roller comprising a second cleaning implement on at least part of an outer surface of the second-stage cleaning roller.

6. The sheet-cleaning system of claim 5, wherein the first cleaning implement of the first-stage cleaning roller is a different type of cleaning implement than the second cleaning implement of the second-stage cleaning roller.

7. The sheet-cleaning system of claim 6, wherein the first-stage cleaning roller comprises a first first-stage cleaning roller, wherein the second-stage cleaning roller comprises a first second-stage cleaning roller, wherein the sheet-cleaning system further comprises a second first-stage cleaning roller opposite the first first-stage cleaning roller and a second second-stage cleaning roller opposite the first second-stage cleaning roller, wherein the sheet support is positioned between the first and second first-stage cleaning rollers and between the first and second second-stage cleaning rollers.

8. The sheet-cleaning system of claim 1, wherein the drive assembly comprises an infeed drive assembly, wherein the drive roller comprises an infeed drive roller, wherein the drive actuator comprises an infeed drive actuator, the sheet-cleaning system further comprising an outfeed drive assembly comprising an outfeed drive roller driven by an outfeed drive actuator.

9. The sheet-cleaning system of claim 8, wherein the electrostatic-discharge device is downstream of the infeed drive roller and upstream of the outfeed drive roller, wherein the cleaning roller is upstream of the outfeed drive roller.

10. The sheet-cleaning assembly of claim 9, further comprising a second electrostatic discharge device downstream of the cleaning roller.

11. The sheet-cleaning assembly of claim 10, wherein the second electrostatic discharge device is downstream of the inlet of the vacuum housing.

12. The sheet-cleaning assembly of claim 1, further comprising a cleaning-assembly frame, wherein the cleaning roller is mounted to the cleaning-assembly frame via a rail, wherein the rail is extendable such that the cleaning roller is movable relative to the frame between a working position in which the cleaning roller is substantially within the cleaning-assembly frame and maintenance position in which the cleaning roller is partially or completely removed from the cleaning-assembly frame.

13. A sheet-cleaning process for removing debris from a sheet, the process comprising:

operating a debris collector to draw air through an inlet of a vacuum housing and into the vacuum housing, wherein the inlet faces an upper surface of a sheet support;

receiving the sheet on the upper surface of the sheet support;

moving the sheet past an electrostatic-discharge device;

as the sheet moves past the electrostatic-discharge device, discharging static electricity from the sheet via the electrostatic-discharge device;

moving the sheet past a cleaning roller downstream of the electrostatic-discharge device and upstream of the inlet of the vacuum housing;

as the sheet moves past the cleaning roller, engaging an upper surface of the sheet with a cleaning implement of the cleaning roller to loosen debris on the upper surface of the sheet;

moving the sheet past the inlet of the vacuum housing such that the debris collector draws the loosened debris through the inlet and into the vacuum housing;

moving the sheet past an upstream cleaning implement positioned downstream of the cleaning roller and upstream of the inlet of the vacuum housing; and as the sheet moves past the upstream cleaning implement, engaging the upper surface of the sheet with the upstream cleaning implement to loosen debris on the upper surface of the sheet; and moving the sheet past a downstream cleaning implement positioned downstream of the inlet of the vacuum housing, and as the sheet moves past the downstream cleaning implement, engaging the upper surface of the sheet with the downstream cleaning implement to loosen debris on the upper surface of the sheet.

14. The sheet-cleaning process of claim 13, wherein the downstream cleaning implement is a second electrostatic-discharge device and further comprising:

moving the sheet past the second electrostatic-discharge device downstream of the inlet of the vacuum housing; and as the sheet moves past the second electrostatic-discharge device, discharging static electricity from the sheet via the second electrostatic-discharge device time.

15. The sheet-cleaning process of wherein the cleaning roller comprises a first-stage cleaning roller, wherein the cleaning implement of the first-stage cleaning roller comprises a first cleaning implement, the sheet-cleaning process further comprising:

moving the sheet past a second-stage cleaning roller downstream of the first-stage cleaning roller; and as the sheet moves past the second-stage cleaning roller, engaging the upper surface of the sheet with the upstream cleaning implement located on the second-stage cleaning roller to loosen debris on the upper surface of the sheet.

* * * * *